United States Patent
Kim et al.

(10) Patent No.: US 9,203,809 B2
(45) Date of Patent: Dec. 1, 2015

(54) COMMUNICATION SYSTEM AND METHOD OF TRANSMITTING AND RECEIVING DATA IN COMMUNICATION SYSTEM

(75) Inventors: Jeong-Hyun Kim, Changwon (KR); Young-Ho Kim, Changwon (KR); Jun-Ho Kim, Seoul (KR); Dong-Jun Lee, Seoul (KR)

(73) Assignee: Hanwha Techwin Co., Ltd., Changwon-si (KR)

( * ) Notice: Subject to any disclaimer, the term of this patent is extended or adjusted under 35 U.S.C. 154(b) by 88 days.

(21) Appl. No.: 13/563,003

(22) Filed: Jul. 31, 2012

(65) Prior Publication Data

US 2013/0258119 A1 Oct. 3, 2013

(30) Foreign Application Priority Data

Mar. 27, 2012 (KR) ........................ 10-2012-0031218

(51) Int. Cl.
| | | |
|---|---|---|
| *G06F 15/16* | (2006.01) | |
| *G06F 15/173* | (2006.01) | |
| *H04L 29/06* | (2006.01) | |
| *H04L 29/12* | (2006.01) | |
| *H04L 29/08* | (2006.01) | |

(52) U.S. Cl.
CPC .......... *H04L 63/029* (2013.01); *H04L 61/2514* (2013.01); *H04L 61/2575* (2013.01); *H04L 67/14* (2013.01)

(58) Field of Classification Search
CPC ..................... H04L 61/2575; H04L 29/12047; H04L 29/12528; H04L 51/28; H04L 67/104
USPC ......... 709/217, 218, 227, 228, 230, 231, 236, 709/238, 245, 249
See application file for complete search history.

(56) References Cited

U.S. PATENT DOCUMENTS

| 7,328,280 B2 * | 2/2008 | Takeda et al. ................. 709/245 |
| 7,590,758 B2 * | 9/2009 | Takeda et al. ................. 709/245 |
| 7,933,273 B2 * | 4/2011 | Takeda et al. ................. 370/400 |

(Continued)

FOREIGN PATENT DOCUMENTS

KR 10-2009-0043192 A 5/2009

OTHER PUBLICATIONS

"CES 2012: Samsung Demos Smartcam WiFi Security Baby Monitor Camera System", Jan. 9, 2012, captured image from the internet, http://www.youtube.com/watch?v=LINAekRLeVI.

(Continued)

*Primary Examiner* — Edward Kim
(74) *Attorney, Agent, or Firm* — Sughrue Mion, PLLC

(57) ABSTRACT

A communication system and a method of transmitting and/or receiving data in the communication system are provided. A method of transmitting media data of a camera to a user terminal in a communication environment in which the camera connected to a first network and the user terminal connected to a third network are connected to a second network includes: obtaining second address information of the second network that corresponds to first address information of the first network, from an address conversion apparatus; obtaining third address information of the second network from an address providing apparatus connected to the second network; transmitting the first through third address information to the user terminal through a session control server connected to the second network; and transmitting the media data to the user terminal based on at least one of the first through third address information.

15 Claims, 9 Drawing Sheets

(56) References Cited

U.S. PATENT DOCUMENTS

| | | | |
|---|---|---|---|
| 7,941,551 B2 * | 5/2011 | Anantharaman et al. | 709/228 |
| 8,060,626 B2 * | 11/2011 | Roy et al. | 709/228 |
| 8,165,091 B2 * | 4/2012 | Nix | 370/331 |
| 8,200,841 B2 | 6/2012 | Kudo | |
| 8,204,066 B2 * | 6/2012 | Chen et al. | 370/401 |
| 8,224,985 B2 * | 7/2012 | Takeda | 709/237 |
| 8,565,190 B2 * | 10/2013 | Takeda et al. | 370/331 |
| 8,725,883 B2 * | 5/2014 | Noyranen et al. | 709/228 |
| 8,732,236 B2 * | 5/2014 | Altmaier et al. | 709/203 |
| 2004/0139228 A1 * | 7/2004 | Takeda et al. | 709/245 |
| 2009/0028167 A1 * | 1/2009 | Takeda et al. | 370/401 |
| 2009/0259754 A1 | 10/2009 | Wu | |
| 2009/0323559 A1 * | 12/2009 | Chen et al. | 370/259 |
| 2009/0323632 A1 * | 12/2009 | Nix | 370/331 |
| 2010/0077087 A1 * | 3/2010 | Roy et al. | 709/228 |
| 2010/0217814 A1 | 8/2010 | Strueber | |
| 2010/0217837 A1 * | 8/2010 | Ansari et al. | 709/218 |
| 2010/0217874 A1 * | 8/2010 | Anantharaman et al. | 709/228 |
| 2010/0312901 A1 * | 12/2010 | Noyranen et al. | 709/228 |
| 2011/0200009 A1 * | 8/2011 | Takeda et al. | 370/331 |
| 2011/0270932 A1 * | 11/2011 | Chaturvedi et al. | 709/206 |
| 2012/0110100 A1 * | 5/2012 | Hiramatsu | 709/206 |
| 2012/0113977 A1 * | 5/2012 | Shimoosawa et al. | 370/352 |

OTHER PUBLICATIONS

Eugene Kim, "Samsung Unveils Wireless Camera Solutions", Jan. 8, 2012, captured image from the internet, http://www.pcmag.com/article2/0,2817,2398313,00.asp.

* cited by examiner

COMMUNICATION SYSTEM AND METHOD OF TRANSMITTING AND RECEIVING DATA IN COMMUNICATION SYSTEM

CROSS-REFERENCE TO RELATED PATENT APPLICATION

This application claims priority from Korean Patent Application No. 10-2012-0031218, filed on Mar. 27, 2012, in the Korean Intellectual Property Office, the disclosure of which is incorporated herein in its entirety by reference.

BACKGROUND

1 Field

Apparatuses and method consistent with exemplary embodiments relate to a communication system and transmitting and receiving data in the communication system.

2 Description of the Related Art

Security issues are emerging as the Internet is rapidly spreading. Thus, companies that install a firewall to block visitors from accessing private resources and control external resources which are accessible to employees are increasing.

A large number of schools and companies internally use a local interne protocol (IP) address by using a network address translation (NAT). By using a NAT, various users may access the Internet with a limited number of official IP addresses, and security issues may be advantageously solved since input/output data has to pass through the NAT to change an address. Accordingly, a NAT may be installed as a portion of a router or a firewall.

However, as network environments of users vary, transmission or reception of data depending on a specific protocol may be impossible due to a firewall or the like, and thus an application service based on the specific protocol may not be performed. That is, depending on a network environment of a specific user, a service provider may not provide a specific service to users.

SUMMARY

One or more exemplary embodiments provide a communication system for transmitting and receiving data between terminals connected to different networks and a method of transmitting and receiving data in the communication system.

One or more exemplary embodiments also provide a communication system and a method of transmitting and receiving data in the communication system, in which a user who does not have knowledge about networks may simply access equipment placed in a network address translation (NAT)/firewall environment.

According to an aspect of an exemplary embodiments, there is provided a method of transmitting media data of a camera to a user terminal in a communication environment in which the camera connected to a first network and the user terminal connected to a third network are connected to a second network, the method including: obtaining second address information of the second network that corresponds to first address information of the first network, from an address conversion apparatus; obtaining third address information of the second network from an address providing apparatus connected to the second network; transmitting the first through third address information to the user terminal through a session control server connected to the second network; and transmitting the media data to the user terminal based on at least one of the first through third address information.

The transmitting the media data may include: connecting a media session with the user terminal based on the first or second address information, and directly transmitting the media data to the user terminal; or directly transmitting the media data to the user terminal based on the third address information.

The directly transmitting the media data based on the third address information may include: receiving fourth address information of the second network obtained by the user terminal from the address providing apparatus, through the session control server from the user terminal; and directly transmitting the media data to the user terminal based on the third address information and the fourth address information.

The transmitting of the media data may include transmitting the media data to the user terminal through the session control server if direct transmission of the media data to the user terminal has failed.

When the first network and the second network are the same, the first address information may be the same as the third address information, and the second address information may be set to zero.

According to another aspect of an exemplary embodiments, there is provided a method of receiving media data from a camera controlled by a user terminal in a communication environment in which the camera connected to a first network and the user terminal connected to a third network are connected to a second network, the method including: receiving first address information of the first network of the camera, second address information of the second network obtained by the camera from an address conversion apparatus and corresponding to the first address information of the first network, and third address information of the second network obtained from an address providing apparatus connected to the second network, from the camera through a session control server connected to the second network; and receiving the media data from the camera based on at least one of the first through third address information.

The receiving the media data may include: connecting a media session with the camera based on the first or second address information, and directly receiving the media data from the camera; or transmitting fourth address information of the second network obtained from the address providing apparatus to the camera through the session control server, and directly receiving the media data from the camera based on the third address information and the fourth address information.

The receiving of the media data may further include; when direct reception of the media data from the camera has failed, transmitting a request for the media data to the camera through the session control server and receiving the media data from the camera through the session control server.

According to another aspect of an exemplary embodiments, there is provided a camera for transmitting media data to a user terminal in a communication environment in which the camera connected to a first network and the user terminal connected to a third network are connected to a second network, the camera including: a memory for storing first address information of the first network, second address information of the second network obtained from an address conversion apparatus and corresponding to the first address information of the first network, and third address information of the second network obtained from an address providing apparatus connected to the second network: and a control unit for transmitting the first through third address information to the user terminal through a session control server connected to the second network and transmitting the media data to the user terminal based on at least one of the first through third address information.

The controller may control pan/tilt/zoom (PTZ) operations and internal settings of the camera based on a control signal received from the user terminal through the session control server and may notify an event to the user terminal through the session control server if the event is sensed from the media data.

The controller may directly transmit the media data to the user terminal based on the first or second address information, or may directly transmit the media data to the user terminal based on the third address information.

The controller may receive fourth address information of the second network obtained by the user terminal from the address providing apparatus through the session control server from the user terminal, and may transmit the media data to the user terminal based on the third address information and the fourth address information.

The camera may transmit the media data to the user terminal through the session control server if direct transmission of the media data to the user terminal has failed.

According to another aspect of an exemplary embodiments, there is provided a method of transmitting and receiving media data between a camera and a user terminal in a communication environment in which the camera connected to a first network and the user terminal connected to a third network are connected to a second network, the method including: obtaining second address information of the second network that corresponds to first address information of the first network, from an address conversion apparatus and obtaining third address information of the second network from an address providing apparatus connected to the second network, using the camera; transmitting the first through third address information to the user terminal through a session control server connected to the second network, using the camera; requesting the camera to transmit media data based on one of the first through third address information, using the user terminal; and directly transmitting the media data to the user terminal, using the camera.

According to another aspect of an exemplary embodiments, there is provided a communication system in which a camera connected to a first network and a user terminal connected to a third network are connected to a second network, the communication system including: an address conversion apparatus for converting first address information of the first network of the camera into second address information of the second network; an address providing server for providing third address information of the second network to the camera and providing fourth address information of the second network to the user terminal; and a session control server for controlling a session connection between the camera and the user terminal, wherein the camera obtains the second address information and the third address information, transmits the first through third address information to the user terminal through the session control server, and directly transmits the media data to the user terminal based on at least one of the first through third address information.

A system and method according to the exemplary embodiments may address difficulties in passing a NAT due to a conventional NAT/firewall between terminals connected to different networks, by using XMPP/STUN protocols, and may provide a convenient user access environment.

BRIEF DESCRIPTION OF THE DRAWINGS

The above and other aspects will become more apparent by describing in detail exemplary embodiments thereof with reference to the attached drawings, in which.

DETAILED DESCRIPTION OF THE INVENTION

Figure 1:
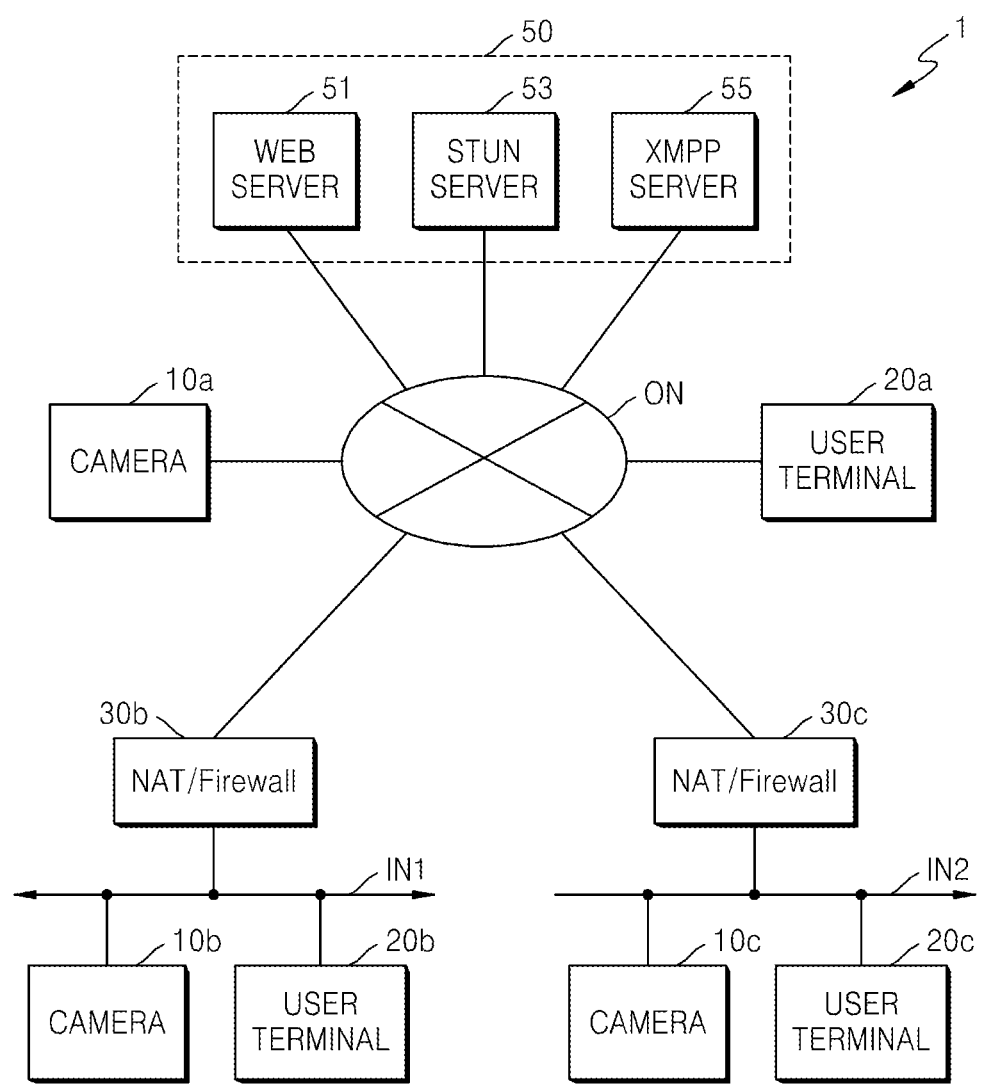
FIG. 1 is a diagram illustrating a communication system according to an exemplary embodiment.

As the inventive concept allows for various changes and numerous embodiments, particular exemplary embodiments will be illustrated in the drawings and described in detail in the written description. However, this is not intended to limit the inventive concept to particular modes of practice, and it is to be appreciated that all changes, equivalents, and substitutes that do not depart from the spirit and technical scope of the inventive concept are encompassed in the present invention. In the description of exemplary embodiments, certain detailed explanations of related art are omitted when it is deemed that they may unnecessarily obscure the essence of the invention.

While such terms as "first", "second", etc., may be used to describe various components, such components must not be limited to the above terms. The above terms are used only to distinguish one component from another. For example, a first component may be referred to as a second component, and likewise, a second component may be referred to as a first component without departing from the scope of the inventive concept. In addition, a series of processing operations include not only processing operations that are sequentially executed but also processing operations that are executed in parallel or individually.

As used herein, the term "and/or" includes any and all combinations of one or more of the associated listed items.

FIG. 1 is a diagram illustrating a communication system 1 according to an exemplary embodiment.

Referring to FIG. 1, the communication system 1 includes a plurality of cameras 10a, 10b, and 10c, a plurality of user terminals 20a, 20b, and 20c, and a server 50.

The plurality of cameras 10a, 10b, and 10c and the plurality of user terminals 20a, 20b, and 20c may belong to a communication network of a network address translation (NAT) and/or firewall environment (hereinafter, referred to as "an inner network IN1 or IN2") or public internet protocol (IP) environment (hereinafter, referred to as "an outer network ON"). The inner networks, which include a first network IN1 and a second network IN2, and the outer network ON include a wired communication network and a wireless communication network.

In the embodiment of FIG. 1, the camera 10a and the user terminal 20a belong to the outer network ON, the camera 10b and the user terminal 20b belong to the first inner network IN1, and the camera 10c and the user terminal 20c belong to the second inner network IN2. The user terminals 20a, 20b, and 20c may be personal computers or mobile terminals such as smart phones or tablets. A NAT/Firewall (hereinafter, referred to as a "NAT") 30b and a NAT 30c may be implemented by using a router or a sharer.

Although, for convenience of explanation, a case where one camera and one user terminal belong to each network IN1, IN2, and ON is illustrated in FIG. 1, two or more cameras and two or more user terminals may belong to each network IN1, IN2, and ON. In addition, although one NAT is disposed in each of the first and second inner networks IN1 and IN2 in FIG. 1, two or more NATs may be multiply used in each of the first and second inner networks IN1 and IN2 by using a tree structure or the like.

The server 50 may include a web server 51, a simple traversal of user datagram protocol (UDP) through NAT (STUN) server 53, and an extensible messaging and presence protocol (XMPP) server 55. Each of the servers 51, 53, and 55 may be independently implemented, or the servers 51, 53, and 53 may be implemented in a unified structure so that one server performs a function of each server.

When a user terminal uses a web browser, the web server 51 transmits a page (a client) of a program, which the user terminal desires to execute, to the user terminal by using a hyper text transfer protocol (HTTP), as a user interface. The STUN server 53 provides address information to be used in the outer network ON to a camera and a user terminal by using a STUN protocol. The XMPP server 55 supports a media session connection between a camera and a user terminal and a media transmission and reception between the camera and the user terminal.

In order to access equipment placed in a conventional NAT/Firewall environment, a port forwarding of a NAT/Firewall has to be manually set. However, in this case, a user has to know in advance a method of setting the port forwarding of the NAT/Firewall and needs knowledge about networks.

The communication system 1 according to the current embodiment provides an easy access environment to a user who does not have knowledge about networks by using a universal plug and play (UPnP) protocol, the STUN protocol, and an XMPP.

The UPnP protocol is a protocol that helps equipment connected to a network to automatically set the port forwarding of the NAT/Firewall. The port forwarding of the NAT/Firewall may be automatically set by using the UPnP protocol, but the UPnP protocol may be used only in equipment supporting the UPnP protocol and may cause difficulty in that it has to be used together with another service, such as a dynamic domain name system (DDNS) or the like, due to continuous change of state. In addition, when conflicting with a previously set content, a port forwarding of NAT/Firewall equipment may not be set by using the UPnP protocol. In order to address such problem, the communication system 1 according to the current embodiment uses the STUN protocol.

The STUN protocol is a protocol that helps equipment to find whether the equipment itself is in inside of a NAT, i.e., an inner network (a private network), a type of the NAT, and a public IP address/port.

The XMPP is an XML-based protocol in which an instant messenger (IM) is used in a message exchange, a notice of log-in condition, or the like.

Figure 2:
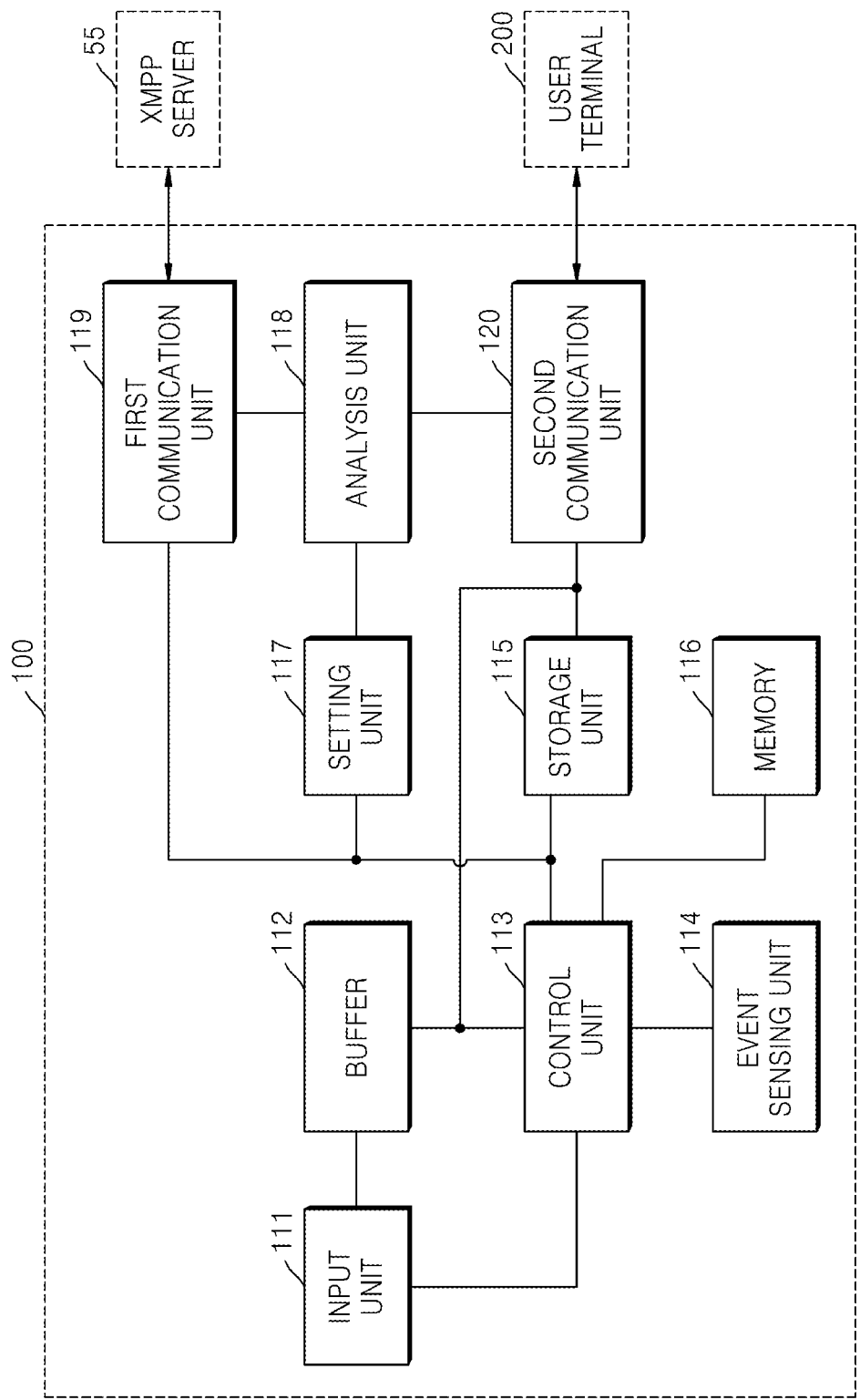
FIG. 2 is a block diagram schematically illustrating a configuration of a camera according an exemplary embodiment.

FIG. 2 is a block diagram schematically illustrating a configuration of a camera 100 according an exemplary embodiment. The configuration of the camera 100 illustrated in FIG. 2 may be applied to each of the cameras 10a, 10b, and 10c of FIG. 1, and may be an IP camera that may be connected to a communication network using a transmission control protocol (TCP)/IP.

The camera 100 includes an input unit 111, a buffer 112, a control unit 113, an event sensing unit 114, a storage unit 115, a memory 116, a setting unit 117, an analysis unit 118, a first communication unit 119, and a second communication unit 120.

The storage unit 115 stores a video signal and/or an audio signal (hereinafter, referred to as "media data") which are input from the input unit 111 through the buffer 112. The input unit 111 may include a video sensor and an audio sensor.

The control unit 113 controls each component of the camera 100, and performs signal processing such as scheduling of the media data, motion detection in an input video, data correction, and video compression.

The event sensing unit 114 analyzes the media data according to a set algorithm, and determines whether a predetermined event is generated. When an event is sensed by the event sensing unit 114, the control unit 113 notifies generation of the event through the first communication unit 119.

Figure 3:
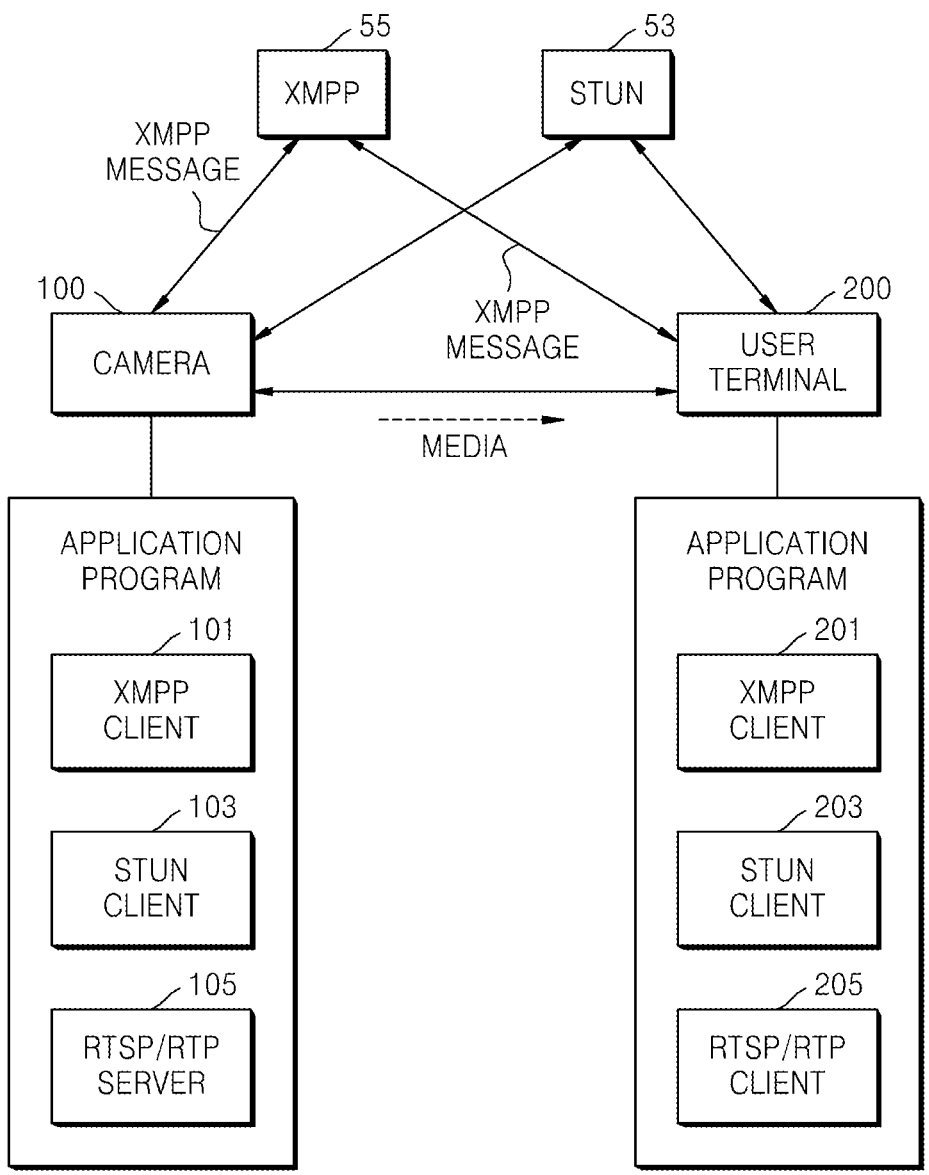
FIG. 3 is a diagram for explaining a relation between components of a communication system according to an exemplary embodiment.

The memory 116 stores application programs such as an XMPP client 101, a STUN client 103, and a real-time streaming protocol (RTSP)/real-time transport protocol (RTP) server 105, which are illustrated in FIG. 3, and the like, and the control unit 113 may control the camera 100 to communicate with a user terminal 300 connected to the camera 100 and perform a necessary operation by driving a corresponding application program.

The setting unit 117 receives a camera control signal received through the first communication unit 119, and the control unit 113 controls pan/tilt/zoom (PTZ) operations and internal settings of the camera 100 according to the camera control signal.

The analysis unit 118 classifies signals received through the first communication unit 119 and the second communication unit 120, and then outputs the classified signals to a corresponding component. The analysis unit 118 also classifies signals received from a component, and then outputs the classified signals to the outside through the first communication unit 119 and the second communication unit 120.

The camera 100 communicates with the XMPP server 55 by using the first communication unit 119. The first communication unit 119 receives the camera control signal through the XMPP server 55 from the user terminal 200, and notifies an event to the user terminal. In addition, the first communication unit 119 transmits or receives a message for a session connection using an RTSP over an XMPP protocol to or from the user terminal 200 through the XMPP server 55. The camera 100 performs direct communication through a peer-to-peer (P2P) connection with the user terminal 200 according to an RTSP/RTP protocol by using the second communication unit 120. The direct communication may mean a communication in which a camera and a user terminal directly transmit or receive data to or from each other without using a separate server or terminal even though there is equipment such as a NAT/Firewall or the like between the camera and the user terminal. In addition, the camera 100 communicates with the STUN server 53 by using the first communication unit 119.

FIG. 3 is a diagram for explaining a relation between components of a communication system or a network according to an exemplary embodiment.

A camera 100 and a user terminal 200 each may exist in an inner network or an outer network. The camera 100 has installed therein application programs such as an XMPP client 101, a STUN client 103, an RTSP/RTP server 105, and the like. The user terminal 200 has installed therein application programs such as an XMPP client 201, a STUN client 203, an RTSP/RTP client 205, and the like. The XMPP client 101 and the XMPP client 201 may be implemented by using a user interface such as an instant messenger (IM).

Although not illustrated, the user terminal 200 may communicate with a web server 51 by using a web browser. The user terminal 200 may access the web server 51 according to a HTTP by using the web browser, and then may download pages (an XMPP client, a STUN client, and the like), which are various kinds of application programs for a media session connection and media transmission/reception, from the web server 51. When the user terminal 200 is a mobile terminal, application programs for a mobile, such as an XMPP client, a STUN client, and the like, may be installed without installing the web browser.

The camera 100 and the user terminal 200 may communicate with an XMPP server 55 by transmitting or receiving an XMPP message by using the XMPP client 101 and the XMPP client 201, respectively. Thus, the camera 100 and the user terminal 200 may communicate with each other through the XMPP server 55. In this case, the user terminal 200 may simultaneously communicate with XMPP clients of a plurality of cameras through the XMPP server 55 by using the XMPP client 201.

For example, the camera 100 may notify an event by transmitting an XMPP message to the user terminal 200 through the XMPP server 55. In addition, the camera 100 may provide media data to the user terminal 200 by transmitting an XMPP message including the media data to the user terminal 200 through the XMPP server 55. And, the user terminal 200 may control PTZ operations and internal settings of the camera 100 by transmitting an XMPP message including a camera control signal to the camera 100 through the XMPP server 55. In this case, the camera control signal may be transmitted according to a camera control protocol (CCP). In addition, the user terminal 200 and the camera 100 may connect media sessions to each other by transmitting and receiving an XMPP message including data for a media session connection through the XMPP server 55. In this case, the data for a media session connection may be transmitted according to an RTSP.

In addition, the camera 100 and the user terminal 200 may communicate with a STUN server 53 by using the STUN client 103 and the STUN client 203, respectively.

The camera 100 and the user terminal 200 may perform direct P2P communication with each other by using the RTSP/RTP server 105 and the RTSP/RTP client 205. The user terminal 200 may receive media data through the P2P communication with the camera 100. The RTSP is a protocol standardized by the Internet Engineering Task Force (IETF) to transmit or receive multimedia data such as video data and audio data in real time. The RTSP is a protocol that is used when transmitting or receiving streaming data by remotely controlling a server providing the data, and is a protocol that is used for remotely performing a control operation such as "PLAY" or "PAUSE". An RTP is used for transmitting or receiving media data together with the RTSP. The RTP is a protocol in which transmission of real time multimedia data is used, and may sense a packet loss and sequence of media data by using information (for example, time stamps and sequence numbers) included in the RTP.

In the current embodiment, the camera 100 and the user terminal 200 in different communication networks have to obtain their respective address information to perform communication therebetween.

The camera 100 obtains three pieces of address information. A first piece of address information is a local IP address and port (hereinafter, referred to as a "local address" (or a "private address") of the camera 100. A second piece of address information is an official IP address and port (hereinafter, referred to as an "external address") of a NAT connected to the camera 100 obtained by the camera 100 from the NAT through a UPnP protocol. A third piece of address information is an official IP address and port (hereinafter, referred to as an "official address") of the NAT connected to the camera 100 obtained by the camera 100 from the STUN server 53 through a STUN protocol. When multiple NATs are used in an inner network, external addresses of the multiple NATs may be different from an official address. For example, when multiple NATs having a tree structure are used, an external address of a most significant parent NAT is the same as an official address. However, external addresses of offspring NATs are different from an official address. In this case, official addresses of all NATs are the same as each other.

The user terminal 200 obtains an official address of a NAT connected to the user terminal 200 from the STUN server 53 through the STUN protocol. The user terminal 200 may confirm from the obtained official address whether the user terminal 200 exists in an inner network and whether the user terminal 200 exists under a control of the same NAT in the same inner network as the camera 100.

Figure 4:
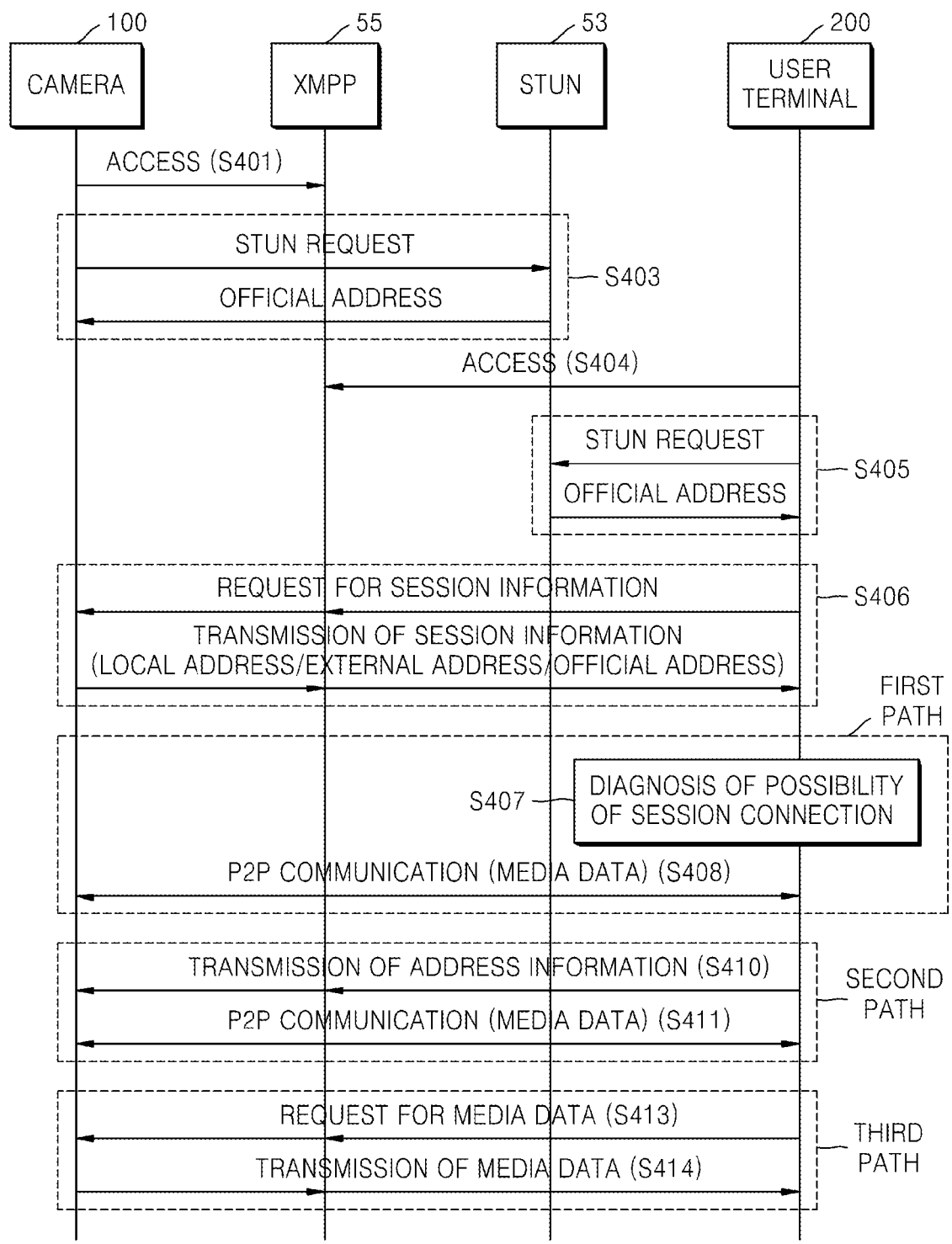
FIG. 4 is a flowchart illustrating signal flows between components of a communication system according to an exemplary embodiment.

FIG. 4 illustrates signal flows between components of a communication system according to an exemplary embodiment. In FIG. 4, a user terminal 200 that is a mobile terminal is illustrated as an example. If the user terminal 200 is a computer using a web browser, the user terminal 200 may access (i.e., log into) a web server 51, and then download various kinds of application programs necessary for communicating with a camera 100.

The communication system of FIG. 4 shows a network environment in which the camera 100 is connected to an outer network, and the user terminal 200 is connected to an inner network or the outer network, as an example.

When power is applied to the camera 100, the camera 100 accesses (i.e., logs into) an XMPP server 55, and then maintains a state in which communication is possible (operation S401).

The camera 100 transmits a request for a STUN to a STUN server 53, and obtains an official address for a media session connection from the STUN server 53 (operation S403). The camera 100 stores the obtained official address, external address and/or local address as session information. In this case, since the camera 100 exists in the outer network, the official address is the same as the local address, and the external address is set to zero.

The user terminal 200 accesses (i.e., logs into) the XMPP server 55, and then tries to receive media data from the camera 100 (operation S404).

The user terminal 200 transmits a request for a STUN to the STUN server 53, and obtains an official address from the STUN server 53 (operation S405). Here, when the user terminal 200 exists in the inner network, the obtained official address is an official address of a NAT connected to the user terminal 200. That is, the user terminal 200 may determine in which network the user terminal 200 exists from the obtained official address. Obtaining an official address of the user terminal 200 may be performed before accessing the XMPP server 55.

The user terminal 200 transmits a request for session information to the camera 100 through the XMPP server 55, and obtains the session information including the official address, the external address and/or the local address from the camera

100 (operation S406). The user terminal 200 may determine whether the user terminal 200 exists in the same network as the camera 100 and whether the user terminal 200 exists under a control of the same NAT as the camera 100, based on the obtained session information.

The user terminal 200 selects an optimized network path for media (video/audio) data reception based on the obtained session information.

First, the user terminal 200 may select a first path in which direct communication is performed by using the local address or the external address of the camera 100. The user terminal 200 determines whether a media session may be connected with the camera 100 by using the local address or the external address of the camera 100 obtained from the session information (operation S407). In this case, the user terminal 200 may diagnose whether a media session may be connected with the camera 100 by comparing the local address, the external address, and/or the official address of the camera 100 with the local address, the external address, and/or the official address of the user terminal 200. If a media session may be connected with the camera 100, the user terminal 200 connects a media session with the camera 100 based on the local address or the external address of the camera 100. Accordingly, the user terminal 200 may directly request the camera 100 to transmit media data, and may receive the media data from the camera 100 (operation S408).

When media data reception through the first path is impossible, the user terminal 200 may select a second path in which direct communication is performed by using the official address of the camera 100. The user terminal 200 transmits address information (the official address) of the user terminal 200 to the XMPP server 55, and the XMPP server 55 transmits the address information (the official address) to the camera 100 (operation S410). The user terminal 200 transmits a request for media data to the camera 100 through the XMPP server 55, and the camera 100 directly transmits the media data to the user terminal 200 by using the camera's own official address and the official address of the user terminal 200 (operation S411). The user terminal 200 may request the media data simultaneously while transmitting the user terminal's own address information. For example, the user terminal 200 may transmit a request for media data to the camera 100 through an XMPP message according to the RTSP, and the camera 100 may directly transmit the media data to the user terminal 200 in response to the request for the media data, which is received according to an RTSP over an XMPP.

When media data reception through the first path and the second path is impossible, the user terminal 200 may select a third path using the XMPP server 55. The user terminal 200 transmits a request for media data to the camera 100 through the XMPP server 55 (operation S413), and the camera 100 loads an XMPP message with the media data, and then relays the XMPP message to the user terminal 200 through the XMPP server 55 (operation S414).

Moreover, in order to change settings of the camera 100, the user terminal 200 may transmit control data to the camera 100 through the XMPP server 55 by using a camera control protocol (CCP) or the like. The camera 100 changes a setting thereof by using the control data received according to a CCP over an XMPP.

Communication using an instant messaging (IM) protocol or an XMPP enables bidirectional communication, and may be used for a media session connection request to the camera 100 and a change in the settings of the camera 100. In the camera 100, a notice of event conditions generated in the camera 100 may be transmitted to the user terminal 200 by using the same protocol.

Figure 5:
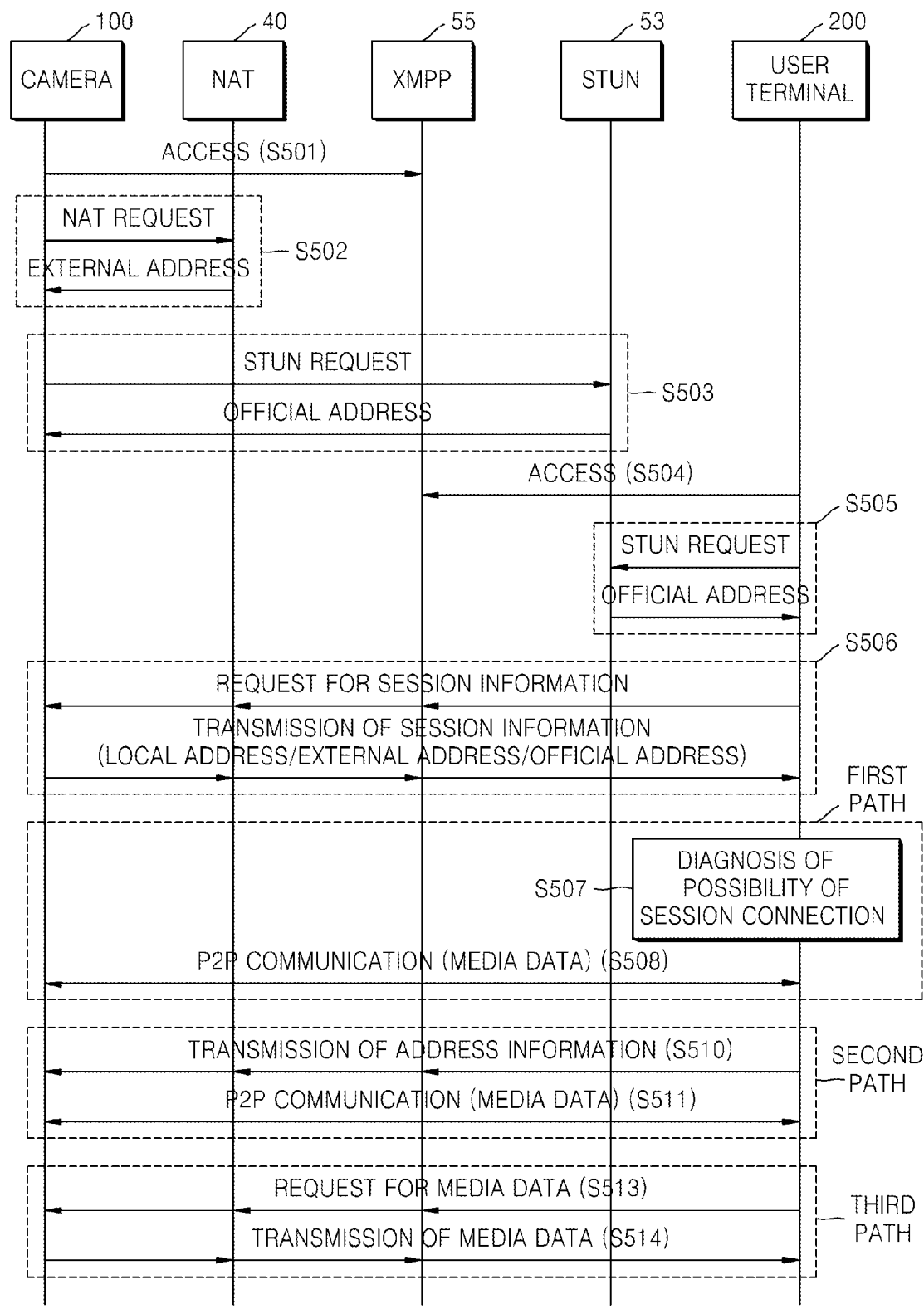
FIG. 5 is a flowchart illustrating signal flows between components of a communication system according to another exemplary embodiment.

FIG. 5 illustrates signal flows between components of a communication system according to another exemplary embodiment. The communication system of FIG. 5 is different from that of FIG. 4 in that a camera 100 exists in an inner network. Below, a repeated description of the descriptions of FIG. 4 will be omitted.

When power is applied to the camera 100, the camera 100 accesses (i.e., logs into) an XMPP server 55, and then maintains a state in which communication is possible (operation S501).

The camera 100 transmits a request for a NAT to a network address translator (NAT) 40, and obtains an external address for a media session connection from the NAT 40 (operation S502). The NAT 40 may automatically change a local address of the camera 100 into an external address according to a UPnP protocol simultaneously while the camera 100 accesses the NAT 40.

In addition, the camera 100 transmits a request for a STUN to a STUN server 53, and obtains an official address for a media session connection from the STUN server 53 (operation S503). The order of obtainment of the external address and the official address is arbitrary. The camera 100 stores the obtained official address, external address and/or local address as session information.

A user terminal 200 accesses (i.e., logs into) the XMPP server 55, and then tries to receive media data (operation S504). The user terminal 200 transmits a request for a STUN to the STUN server 53, and obtains an official address from the STUN server 53 (operation S505).

The user terminal 200 transmits a request for the session information to the camera 100 through the XMPP server 55, and obtains the session information including the official address, the external address and/or the local address from the camera 100 (operation S506).

First, the user terminal 200 may select a first path in which direct communication is performed by using the local address or the external address of the camera 100. The user terminal 200 determines whether a media session may be connected with the camera 100 by using the local address or the external address of the camera 100 obtained from the session information (operation S507). If a media session may be connected with the camera 100, the user terminal 200 connects a media session with the camera 100 based on the local address or the external address of the camera 100. Accordingly, the user terminal 200 may directly transmit a request for media data to the camera 100 and receive the media data from the camera 100 (operation S508).

When media data reception through the first path is impossible, the user terminal 200 may select a second path in which direct communication is performed by using the official address of the camera 100. The user terminal 200 transmits address information (the official address) of the user terminal 200 to the XMPP server 55, and the XMPP server 55 transmits the address information (the official address) to the camera 100 (operation S510). The user terminal 200 transmits a request for the media data to the camera 100 through the XMPP server 55, and the camera 100 directly transmits the media data to the user terminal 200 by using the camera's own official address and the official address of the user terminal 200 (operation S511). The user terminal 200 may request the media data simultaneously while transmitting the user terminal's own address information.

When media data reception through the first path and the second path is impossible, the user terminal 200 may select a third path using the XMPP server 55. The user terminal 200 transmits a request for the media data to the camera 100 through the XMPP server 55 (operation S513), and the camera 100 loads an XMPP message with the media data and then relays the XMPP message to the user terminal 200 through the XMPP server 55 (operation S514).

Figure 6:
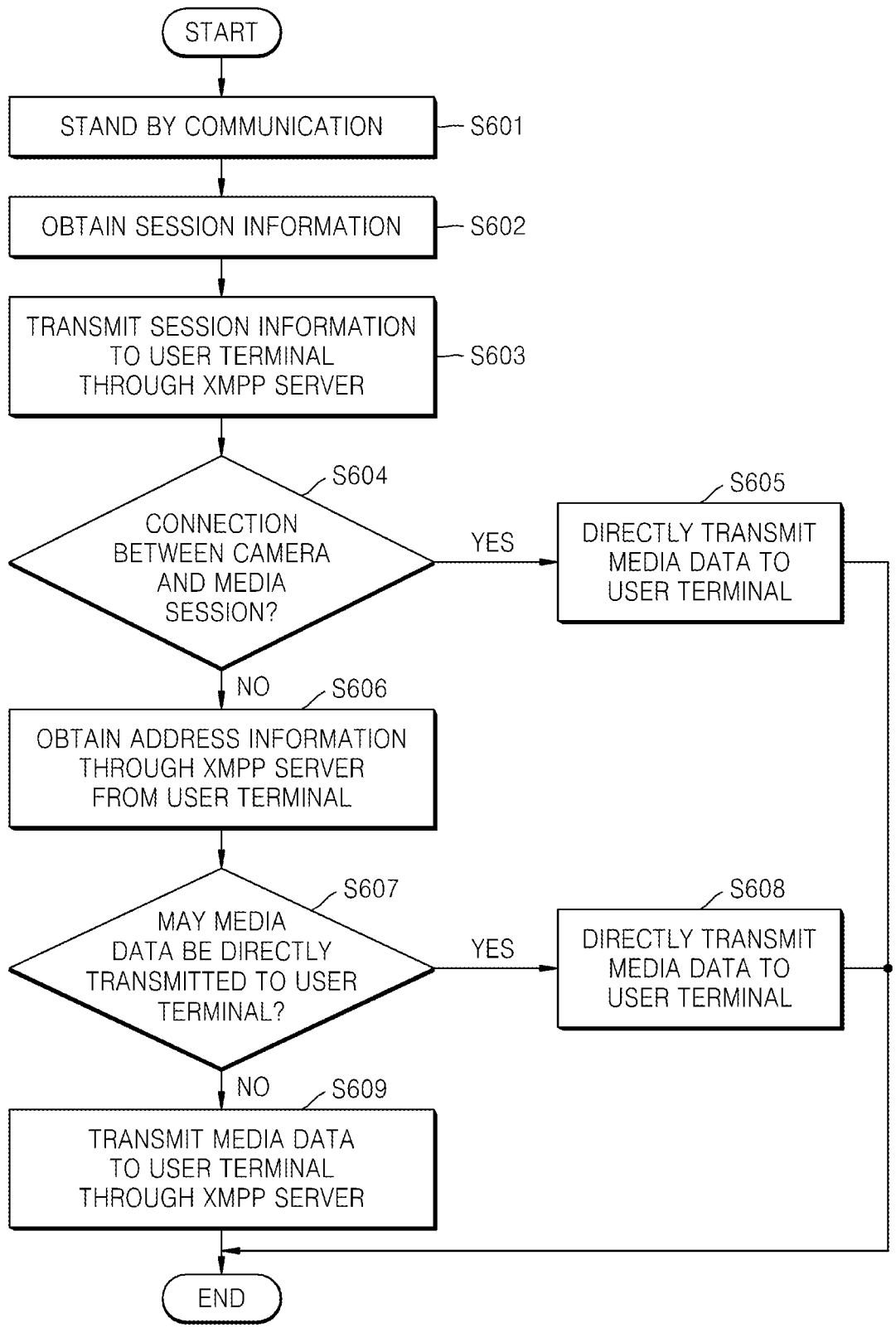
FIG. 6 is a flowchart illustrating a method of transmitting media data of a camera in a communication system, according to an exemplary embodiment.

FIG. 6 is a flowchart illustrating a method of transmitting media data of a camera in a communication system, according to an exemplary embodiment.

The embodiment of FIG. 6 illustrates a method by which a camera transmits media data to a user terminal in a communication environment in which the camera connected to a first network and the user terminal connected to a third network are connected to a second network. The second network is an outer network, and the first network and the third network may be an inner network or an outer network. A STUN server, that is, an address providing apparatus for providing official address information to a camera and a user terminal, and an XMPP server, that is, a session control server for controlling a session connection between the camera and the user terminal, are connected to the second network.

The camera accesses (i.e., logs into) the XMPP server, and then maintains a state in which communication is possible (operation S601) and obtains session information for a media session connection (operation S602). For this, the camera obtains an external address from a NAT, that is, an address conversion apparatus, through a UPnP protocol, and obtains an official address from the STUN server. The camera stores the obtained official address, external address and/or local address as session information. When the first network and the second network are the same, the external address is set to zero, and the local address and the official address are identically set.

When the camera receives a request for the session information from the user terminal through the XMPP server, the camera transmits the session information to the user terminal through the XMPP server (operation S603). In this case, the XMPP server only functions to transmit the session information.

The camera determines whether a media session is connected with the user terminal (operation S604). When a media session is directly connected with the user terminal, the camera directly receives a request for media data from the user terminal based on the local address or the external address of the camera, and directly transmits the media data to the user terminal (operation S605).

When a media session is not connected with the user terminal (operation S604), the camera receives address information (i.e., an official address) obtained by the user terminal from the STUN server, through the XMPP server from the user terminal (operation S606). When a request for media data is received through the XMPP server from the user terminal, the camera determines whether the media data may be directly transmitted to the user terminal by using the address information of the user terminal (operation S607). When the media data may be directly transmitted, the camera directly transmits the media data to the user terminal (operation S608).

When the media data may not be directly transmitted, the camera receives a request for media data through the XMPP server from the user terminal and transmits the media data to the user terminal through the XMPP server (operation S609).

Figure 7:
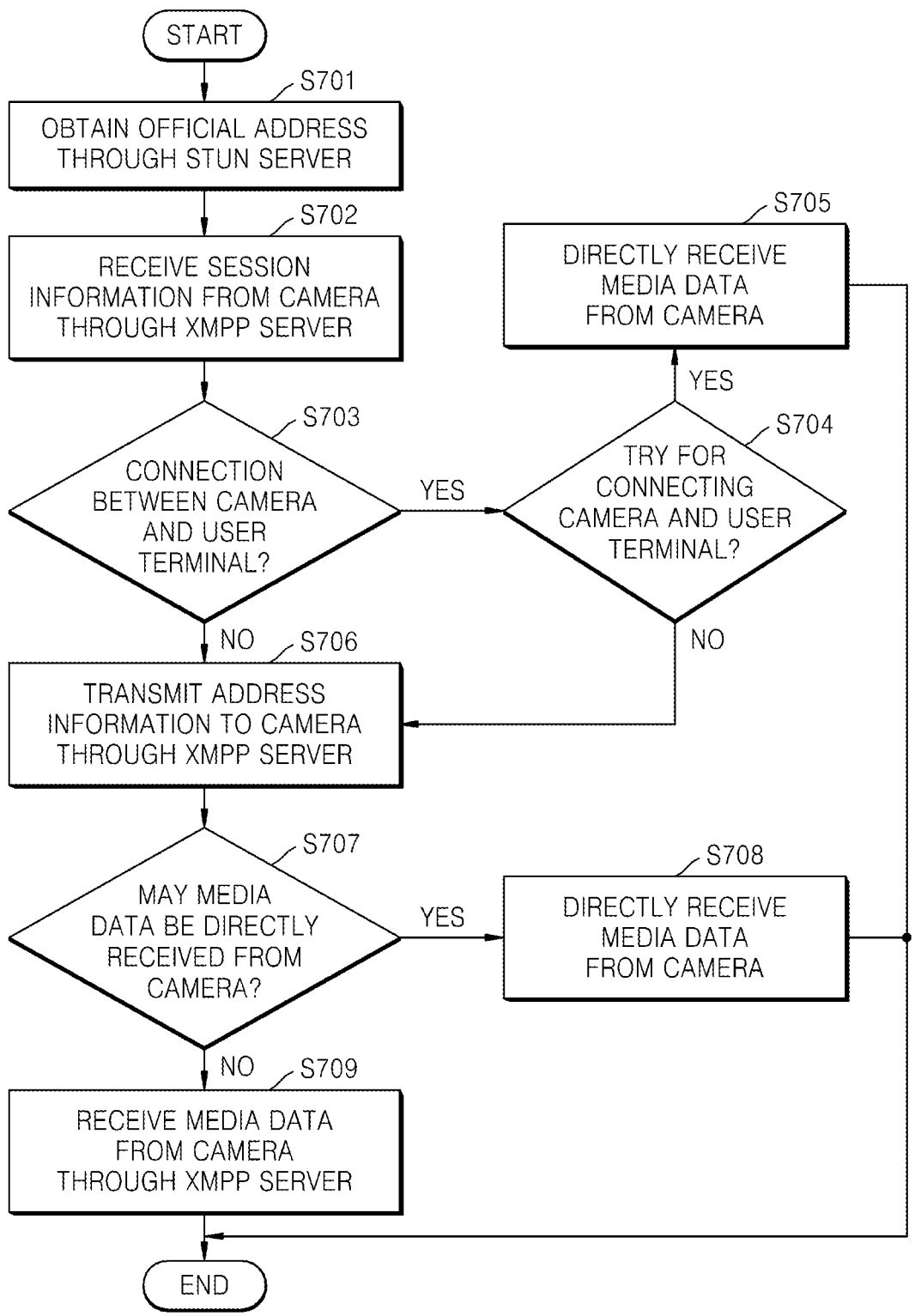
FIG. 7 is a flowchart illustrating a method of receiving media data performed by a user terminal in a communication system, according to an exemplary embodiment.

FIG. 7 is a flowchart illustrating a method of receiving media data performed by a user terminal in a communication system, according to an exemplary embodiment.

The embodiment of FIG. 7 illustrates a method by which a user terminal receives media data from a camera in the same communication environment as the embodiment of FIG. 6, that is, in a communication environment in which the camera connected to a first network and the user terminal connected to a third network are connected to a second network.

The user terminal obtains an official address, that is, address information, through a STUN server (operation S701).

The user terminal transmits a request for session information to the camera through an XMPP server, and receives the session information from the camera through the XMPP server (operation S702). In this case, the XMPP server only functions to transmit the session information. The session information includes an official address, an external address and/or a local address of the camera.

When the user terminal desires to directly connect a media session with the camera (operation S703), the user terminal tries to connect a media session with the camera based on the local address or the external address of the camera (operation S704). In this case, the user terminal may determine whether the media session may be connected with the camera by comparing the official address, the external address and/or the local address of the camera with an official address, an external address and/or a local address of the user terminal.

When the media session is successfully connected (operation S704), the user terminal directly requests the camera to transmit media data, and directly receives the media data from the camera (operation S705).

When the user terminal does not desire to connect the media session with the camera (operation S703) or a media session connection has failed (operation S704), the user terminal transmits address information (that is, the official address) obtained from the STUN server to the camera through the XMPP server (operation S706). The user terminal transmits a request for media data to the camera through the XMPP server, and directly receives the media data from the camera (operation S708) when direct reception of the media data from the camera is possible (operation S707).

When the direct reception of the media data from the camera has failed (operation S707), the user terminal transmits a request for media data to the camera through the XMPP server, and receives the media data from the camera through the XMPP server (operation S709). The user terminal may store the received media data.

Figure 8:
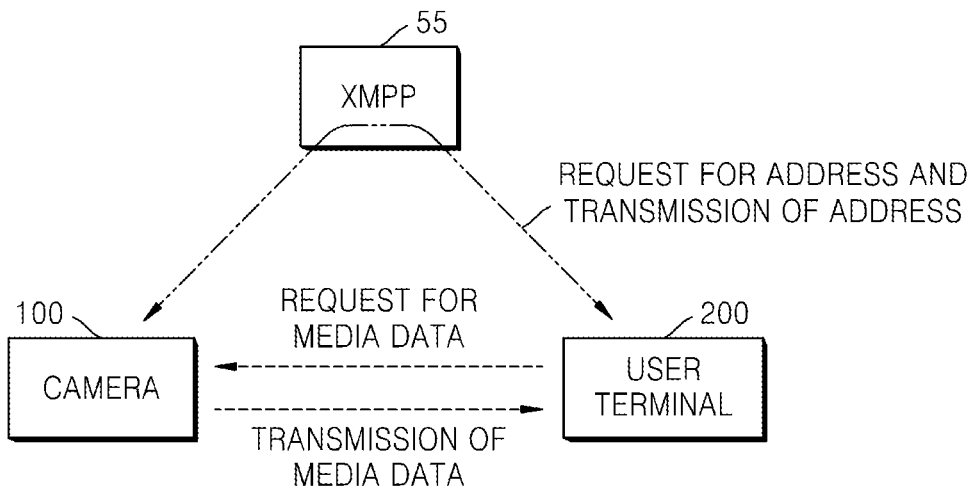
FIGS. 8 through 10 are diagrams showing communication paths according to exemplary embodiments.
Figure 9:
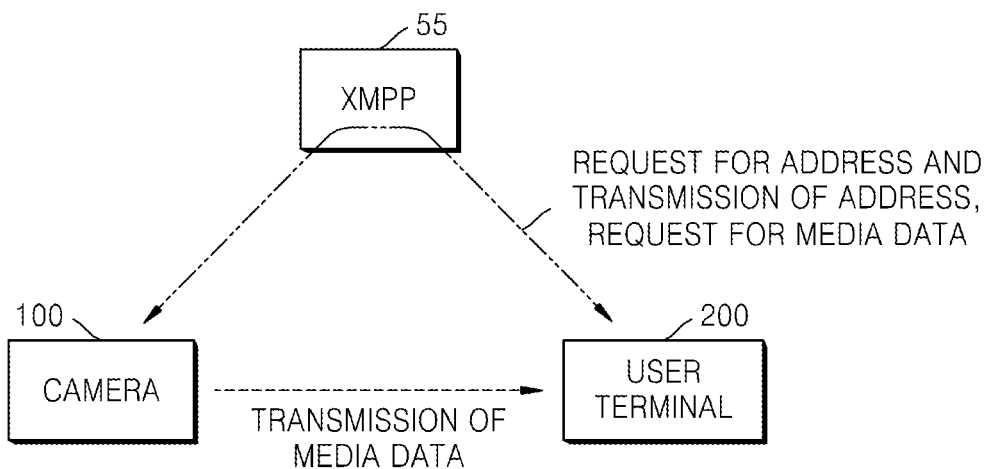
Figure 10:
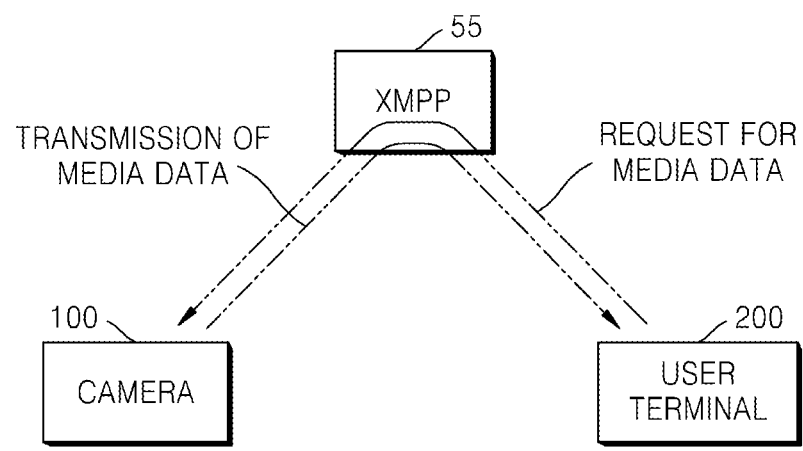

FIGS. 8 through 10 are diagrams showing communication paths according to exemplary embodiments.

FIG. 8 illustrates a first method of transmitting or receiving media data between a user terminal 200 and a camera 100. Referring to FIG. 8, the user terminal 200 transmits a request for address information to the camera 100, and receives an official address, an external address and/or a local address of the camera 100 from the camera 100. The user terminal 200 connects a media session with the camera 100 by using the local address or the external address of the camera 100, and forms a path in which the user terminal 200 may communicate with the camera 100 through a direct P2P method. The user terminal 200 directly transmits a request for media data to the camera 100 and directly receives the media data from the camera 100.

FIG. 9 illustrates a second method of transmitting or receiving media data between a user terminal 200 and a camera 100. Referring to FIG. 9, the user terminal 200 transmits a request for address information to the camera 100, and receives an official address, an external address and/or a local address of the camera 100 from the camera 100. The user terminal 200 transmits its own official address to the camera 100 through an XMPP server 55. Accordingly, a path in which direct P2P communication may be performed between the camera 100 and the user terminal 200 is formed. The user terminal 200 transmits a request for media data to the camera

100 through the XMPP server 55, and directly receives the media data from the camera 100.

FIG. 10 illustrates a third method of transmitting or receiving media data between a user terminal 200 and a camera 100. Referring to FIG. 10, the user terminal 200 transmits a request for address information to the camera 100, and receives an official address, an external address and/or a local address of the camera 100 from the camera 100. The user terminal 200 transmits a request for media data to the camera 100 through an XMPP server 55, and receives the media data through the XMPP server 55 from the camera 100.

In a system and method according to an exemplary embodiment, a setting of a port forwarding of a NAT/Firewall is not necessary by performing media session management and a camera setting by using an IM protocol or an XMPP, and weak points of a UPnP protocol may be made up for by using a STUN protocol, and thus a user who does not have knowledge about networks may easily access a network. Thus, the user may receive a notice of an event from a camera regardless of time and place, and may access a network and then receive media data.

In the system and method according to an exemplary embodiment, a communication is performed by using an XMPP session between a camera and a user terminal, an XMPP is used, exchange of information such as media information and network information is possible by using an XMPP server, and information related to settings such as settings of a camera may be provided through the XMPP server.

A camera according to an exemplary embodiment may be applied to home or industrial surveillance security systems and video conferencing systems that use the Internet.

While the exemplary embodiments have been particularly shown and described with reference to the drawings thereof, it will be understood by those of ordinary skill in the art that various changes in form and details may be made therein without departing from the spirit and scope of the inventive concept as defined by the following claims.

What is claimed is:

1. A method of transmitting media data of a camera to a user terminal in a communication environment in which the camera connected to a first network and the user terminal connected to a third network are connected to a second network, the method comprising:
    obtaining, by the camera, first address information of the first network of the camera;
    obtaining, by the camera, second address information of the second network from an address conversion apparatus connected to the camera;
    obtaining, by the camera, third address information of the second network from an address providing apparatus connected to the second network;
    transmitting, by the camera, the first through third address information to the user terminal through a session control server connected to the second network in response to a request for session information from the user terminal through the session control server;
    receiving, by the camera, a camera control signal from the user terminal through the session control server and notifying, by the camera, an event to the user terminal through the session control server; and
    transmitting, by the camera, the media data to the user terminal based on at least one of the first through third address information,
    wherein the first address information is a private address of the camera, the second address information is an external address of the address conversion apparatus connected to the camera, and the third address information is an official address of the address conversion apparatus connected to the camera which is obtained from the address providing apparatus connected to the camera,
    wherein the transmitting the media data comprises transmitting the media data to the user terminal through the session control server if direct transmission of the media data to the user terminal has failed.

2. The method of claim 1, wherein the address conversion apparatus is the most significant address conversion apparatus among a plurality of address conversion apparatuses connected to the second network, and
    wherein the second address information is the same as the third address information.

3. The method of claim 1, wherein the transmitting the media data comprises:
    connecting a media session with the user terminal based on the first or second address information, and directly transmitting the media data to the user terminal; or
    directly transmitting the media data to the user terminal based on the third address information.

4. The method of claim 3, wherein the second address information comprises external address information of the address conversion apparatus connected to the camera, and
    wherein the third address information comprises official address information of the address conversion apparatus connected to the camera which is obtained from the address providing apparatus.

5. The method of claim 1, wherein the directly transmitting the media data based on the third address information comprises:
    receiving fourth address information of the second network obtained by the user terminal from the address providing apparatus through the session control server from the user terminal; or
    directly transmitting the media data to the user terminal based on the third address information and the fourth address information.

6. The method of claim 5, wherein the second address information comprises external address information of the address conversion apparatus connected to the camera,
    wherein the third address information comprises official address information of the address conversion apparatus connected to the camera which is obtained from the address providing apparatus, and
    wherein the fourth address information comprises official address information of an address conversion apparatus connected to the user terminal which the user terminal obtains from the address providing apparatus through the session control server.

7. The method of claim 1, wherein, when the first network and the second network are the same, the first address information is the same as the third address information, and the second address information is set to zero.

8. A method of receiving media data from a camera controlled by a user terminal in a communication environment in which the camera connected to a first network and the user terminal connected to a third network are connected to a second network, the method comprising:
    receiving, by the user terminal, first address information of the first network of the camera, second address information of the second network obtained by the camera from an address conversion apparatus connected to the camera and third address information of the second network obtained from an address providing apparatus connected to the second network, from the camera through a session control server connected to the second network in response to a request for session information from the user terminal through the session control server; and receiving, by the user terminal, the media data from the camera based on at least one of the first through third address information, wherein the first address information is a private address of the camera, the second address information is an external address of the address conversion apparatus connected to the camera, and the third address information is an official address of the address conversion apparatus connected to the camera which is obtained from the address providing apparatus connected to the camera, wherein the receiving the media data comprises, when direct reception of the media data from the camera has failed, transmitting a request for the media data to the camera through the session control server and receiving the media data from the camera through the session control server, and wherein the user terminal transmits a camera control signal to the camera through the session control server, and the camera notifies an event to the user terminal through the session control server.

9. The method of claim 8, wherein the receiving the media data comprises:

connecting a media session with the camera based on the first or second address information, and directly receiving the media data from the camera; or transmitting fourth address information of the second network obtained from the address providing apparatus to the camera through the session control server, and directly receiving the media data from the camera based on the third address information and the fourth address information.

10. A camera for transmitting media data to a user terminal in a communication environment in which the camera connected to a first network and the user terminal connected to a third network are connected to a second network, the camera comprising:

a memory which stores first address information of the first network of the camera, second address information of the second network obtained from an address conversion apparatus connected to the camera and third address information of the second network obtained from an address providing apparatus connected to the second network; and a control unit which transmits the first through third address information to the user terminal through a session control server connected to the second network in response to a request for session information from the user terminal through the session control server, receives a camera control signal from the user terminal through the session control server, notifies an event to the user terminal through the session control server, and transmits the media data to the user terminal based on at least one of the first through third address information, wherein the first address information is a private address of the camera, the second address information is an external address of the address conversion apparatus connected to the camera, and the third address information is an official address of the address conversion apparatus connected to the camera which is obtained from the address providing apparatus connected to the second network, and wherein the camera transmits the media data to the user terminal through the session control server if direct transmission of the media data to the user terminal has failed.

11. The camera of claim 10, wherein the controller controls at least one of pan, tilt and zoom operations and internal settings of the camera based on a control signal received from the user terminal through the session control server, and notifies an event to the user terminal through the session control server if the event is sensed from the media data.

12. The camera of claim 10, wherein the controller directly transmits the media data to the user terminal based on the first or second address information, or directly transmits the media data to the user terminal based on the third address information.

13. The camera of claim 12, wherein the controller receives fourth address information of the second network obtained by the user terminal from the address providing apparatus through the session control server from the user terminal, and transmits the media data to the user terminal based on the third address information and the fourth address information.

14. A method of transmitting and receiving media data between a camera and a user terminal in a communication environment in which the camera connected to a first network and the user terminal connected to a third network are connected to a second network, the method comprising:

obtaining, by the camera, first address information of the first network of the camera, obtaining, by the camera, second address information of the second network from an address conversion apparatus connected to the camera, and obtaining, by the camera, third address information of the second network from an address providing apparatus connected to the second network;

transmitting, by the camera, the first through third address information to the user terminal through a session control server connected to the second network in response to a request for session information from the user terminal through the session control server;

receiving, by the camera, a camera control signal from the user terminal through the session control server and notifying, by the camera, an event to the user terminal through the session control server;

requesting, by the user terminal, the camera to transmit media data based on one of the first through third address information 1; and directly transmitting, by the camera, the media data to the user terminal, wherein the first address information is a private address of the camera, the second address information is an external address of the address conversion apparatus connected to the camera, and the third address information is an official address of the address conversion apparatus connected to the camera which is obtained from the address providing apparatus connected to the second network, and wherein the directly transmitting the media data comprises transmitting the media data to the user terminal through the session control server if direct transmission of the media data to the user terminal has failed.

15. A communication system in which a camera connected to a first network and a user terminal connected to a third network are connected to a second network, the communication system comprising:

an address conversion apparatus which is connected to the camera and converts first address information of the first network of the camera into second address information of the second network;

an address providing server which is connected to the second network, provides third address information of the second network to the camera, and provides fourth address information of the second network to the user terminal; and a session control server which is connected to the second network and controls a session connection between the camera and the user terminal, wherein the camera obtains the first address information of the first network of the camera, the second address information of the second network, and the third address information of the second network, transmits the first through third address information to the user terminal through the session control server in response to a request for session information from the user terminal through the session control server, receives a camera control signal from the user terminal through the session control server, notifies an event to the user terminal through the session control server, and directly transmits the media data to the user terminal based on at least one of the first through third address information, wherein the first address information is a private address of the camera, the second address information is an external address of the address conversion apparatus connected to the camera, and the third address information is an official address of the address conversion apparatus connected to the camera which is obtained from the address providing apparatus connected to the second network, and wherein the camera transmits the media data to the user terminal through the session control server if direct transmission of the media data to the user terminal has failed.

* * * * *